(12) United States Patent
Chang et al.

(10) Patent No.: US 8,353,394 B2
(45) Date of Patent: Jan. 15, 2013

(54) CONTINUOUS CONSTANT-RATE FEEDING SYSTEM

(75) Inventors: Lieh-Chih Chang, Taipei (TW); How-Ming Lee, Taoyuan County (TW); Chin-Ching Tzeng, Taipei County (TW)

(73) Assignee: Atomic Energy Council—Institue of Nuclear Energy Research, Lungtan, Taoyuan (TW)

( * ) Notice: Subject to any disclaimer, the term of this patent is extended or adjusted under 35 U.S.C. 154(b) by 169 days.

(21) Appl. No.: 13/024,065

(22) Filed: Feb. 9, 2011

(65) Prior Publication Data

US 2012/0199445 A1 Aug. 9, 2012

(51) Int. Cl.
*F26B 3/347* (2006.01)

(52) U.S. Cl. ........ 198/582; 198/533; 198/548; 198/670; 198/671; 366/156.1; 110/257

(58) Field of Classification Search .................. 198/582, 198/533, 545, 548, 550.6, 670, 671; 406/53; 366/156.1; 110/257, 258
See application file for complete search history.

(56) References Cited

U.S. PATENT DOCUMENTS

| | | | | |
|---|---|---|---|---|
| 2,622,985 A * | 12/1952 | Haughey et al. | ............... | 426/449 |
| 3,797,702 A * | 3/1974 | Robertson | ........................ | 222/1 |
| 5,010,831 A * | 4/1991 | Halfhide | ........................ | 110/347 |
| 5,229,010 A * | 7/1993 | Fluchel | ..................... | 210/748.07 |
| 5,423,455 A * | 6/1995 | Ricciardi et al. | .................. | 222/1 |
| 6,120,567 A * | 9/2000 | Cordell et al. | .............. | 48/197 R |
| 6,276,286 B1 * | 8/2001 | Williams et al. | ............. | 110/110 |
| 7,320,561 B2 * | 1/2008 | Ambs et al. | ...................... | 406/31 |
| 8,011,861 B2 * | 9/2011 | Sprouse et al. | ................. | 406/53 |
| 8,200,367 B2 * | 6/2012 | Foley et al. | ..................... | 700/240 |
| 2004/0042335 A1 * | 3/2004 | Cecala et al. | .............. | 366/151.1 |
| 2006/0151525 A1 * | 7/2006 | Wahl | ............................... | 222/77 |
| 2009/0291403 A1 * | 11/2009 | Conti et al. | .................... | 431/346 |
| 2010/0313796 A1 * | 12/2010 | Graham et al. | ............... | 110/229 |

* cited by examiner

*Primary Examiner* — Mark A Deuble
(74) *Attorney, Agent, or Firm* — Jackson IPG PLLC (57) ABSTRACT

A continuous constant-rate feeding system includes at least one storage unit, a scratching unit and a water-cooled screw feeding unit. The storage unit includes a tank and an agitator. The tank stores material and includes upper and lower chambers. The agitator is rotationally located in the upper chamber for agitating the material. The scratching unit includes upper and lower scratchers and a material divider. The upper scratcher is located in the upper chamber and can spin to convey the material from the upper chamber into the lower chamber. The lower scratcher is located in the lower chamber and can spin to convey the material from the lower chamber into the water-cooled screw feeding unit. The material divider locates between the upper and lower chambers and spin automatically or manually to fall the material from the upper chamber into the lower chamber through a specific aperture alternately.

17 Claims, 8 Drawing Sheets

CONTINUOUS CONSTANT-RATE FEEDING SYSTEM

BACKGROUND OF INVENTION

1. Field of Invention

The present invention relates to a continuous constant-rate feeding system and, more particularly, to a continuous constant-rate feeding system for operation at high temperature under high pressure without any risk of jam.

2. Related Prior Art

Bioenergy makes about 15% of primary energy in the world, and about 80% of renewable energy. As the reserve of coal is decreasing while the need for reducing the carbon footprint is increasing, the need of bioenergy is increasing.

In Taiwan, annular biological waste includes about 700 million metric tons of urban garbage, 100 million metric tons of constructional wood waste, 2300 million metric tons of agricultural waste and 2000 million metric tons of industrial waste. If the bioenergy contained in these types of waste can be converted to electricity, the benefits are remarkable. To use the bioenergy, commonly there are two methods: combustion and gasification. In either method, jam of biomass during feeding process is always a problem. The problem of jam is particularly serious to a pressurized gasification system.

The present invention is therefore intended to obviate or at least alleviate the problems as mentioned above.

SUMMARY OF INVENTION

The primary objective of the present invention is to provide a continuous constant-rate feeding system for operation at high temperature and high pressure.

To achieve the foregoing objectives, the continuous constant-rate feeding system includes at least one storage unit, a scratching unit and a water-cooled screw feeding unit. The storage unit includes a tank, an inlet pipe, an upper ball valve, an outlet pipe, a lower ball valve and/or an agitator. The tank stores material and includes upper and lower chambers. The inlet pipe is connected to the upper chamber. The upper ball valve is connected to the inlet pipe. The outlet pipe is connected to the lower chamber. The lower ball valve is connected to the outlet pipe. The agitator is rotationally located in the upper chamber for agitating and preventing the material from sticking to the tank. The scratching unit includes upper and lower scratchers, a cap, internal and external material-limiting elements, and a material divider. The upper scratcher is located in the upper chamber and formed with blades each formed with a bent guiding section. The upper scratcher can spin to convey the material from the upper chamber into the lower chamber. The cap is connected to the blades of the upper scratcher. The lower scratcher is located in the lower chamber and formed with blades. The lower scratcher can spin to convey the material from the lower chamber into the outlet pipe. The internal material-limiting element is located on and connected to the blades of the lower scratcher. The material divider is located between the upper and lower chambers and formed with an aperture defined therein. The material falls from the upper chamber into the lower chamber through the aperture batch by batch as the material divider spins. The external material-limiting element is located beneath and connected to the material divider. The water-cooled screw feeding unit includes a screw feeder, a double seal, a cooling water-recycling joint, a gear motor and at least three sensors. The screw feeder is connected to the lower ball valve. The double seal is connected to the screw feeder. The cooling water-recycling joint is connected to the screw feeder through the double seal. The gear motor is connected to the screw feeder. The sensors sense the operation of the screw feeder and send a corresponding signal to the gear motor.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
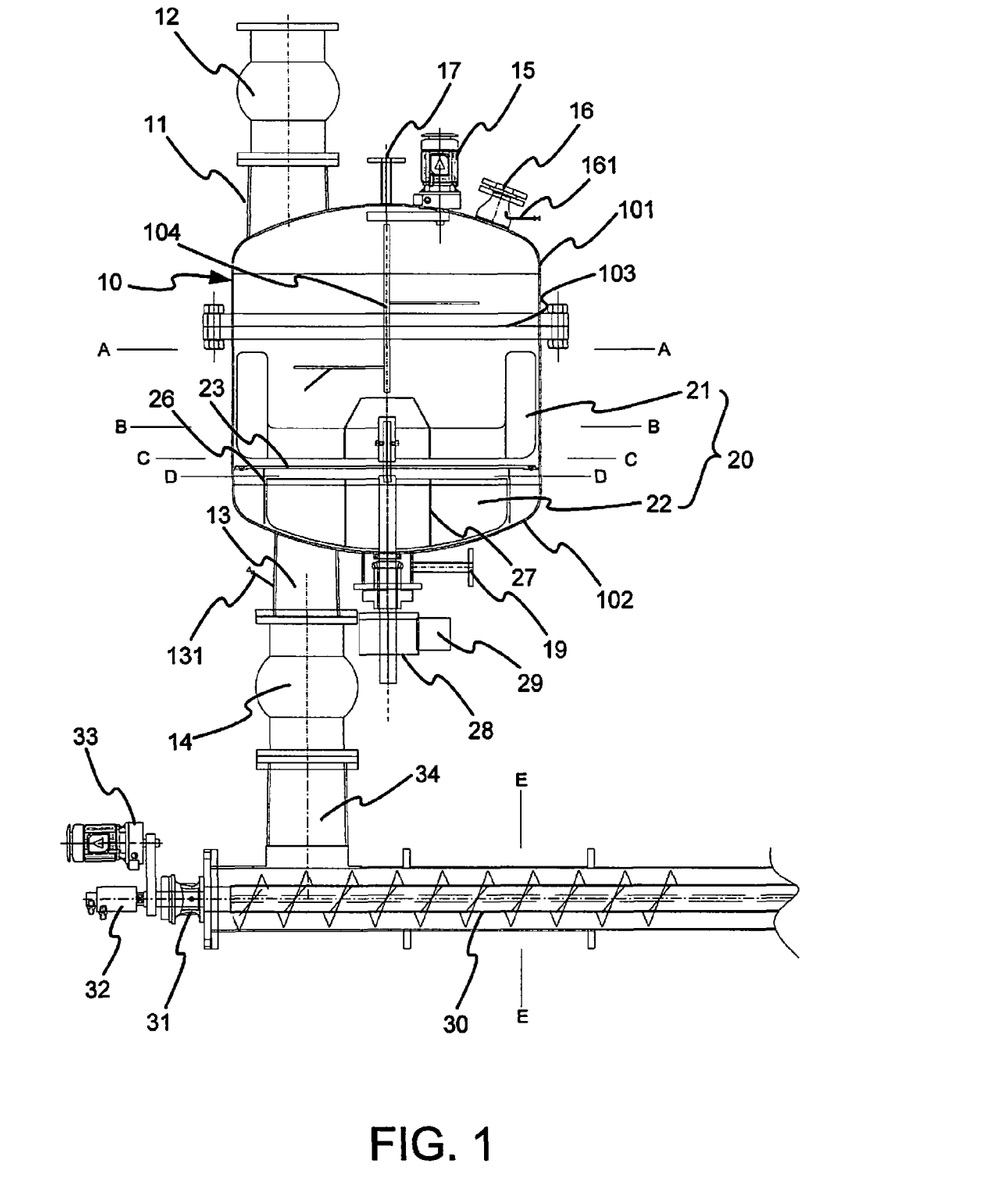
FIG. 1 is a side view of a continuous constant-rate feeding system according to the preferred embodiment of the present invention.

Referring to FIG. 1, a continuous constant-rate feeding system 100 includes at least one storage unit, a scratching unit 20 and a water-cooled screw feeding unit in accordance with the preferred embodiment of the present invention. The continuous constant-rate feeding system is adapted for operation at high temperature under high pressure without any risk of jam.

Figure 3:
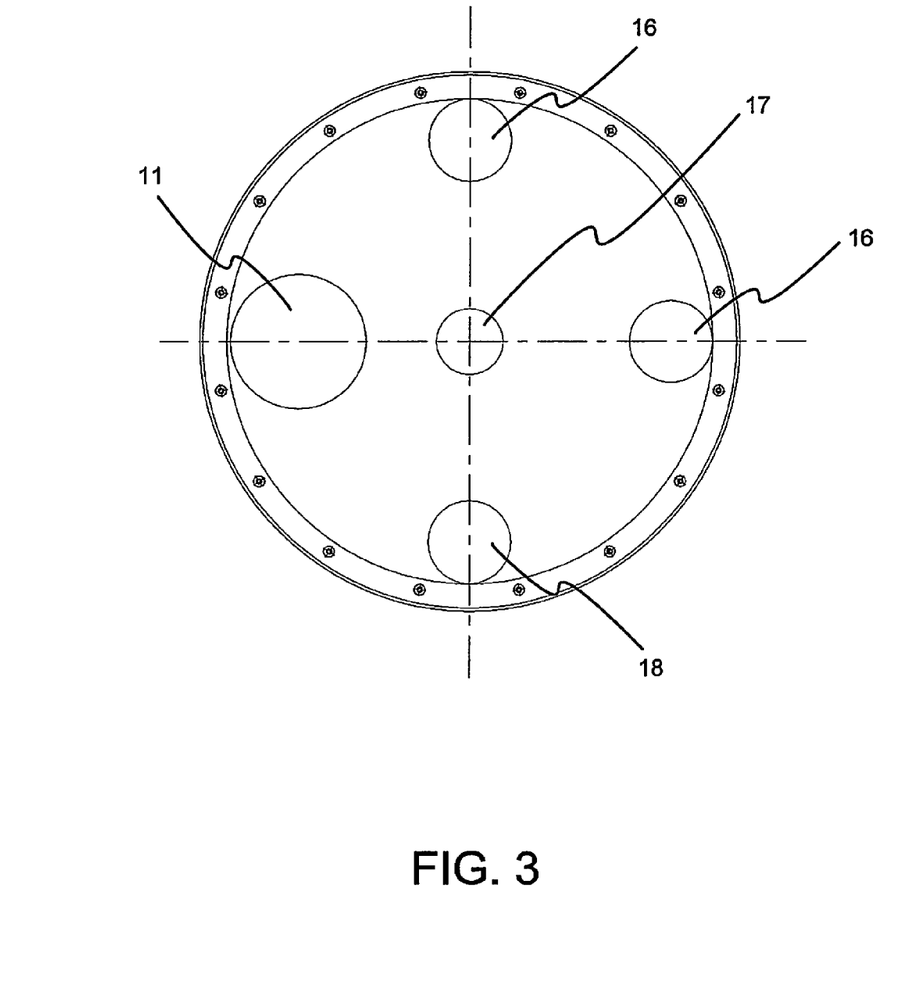
FIG. 3 is a top view of a tank used in the continuous constant-rate feeding system shown in FIG. 1.
Figure 4:
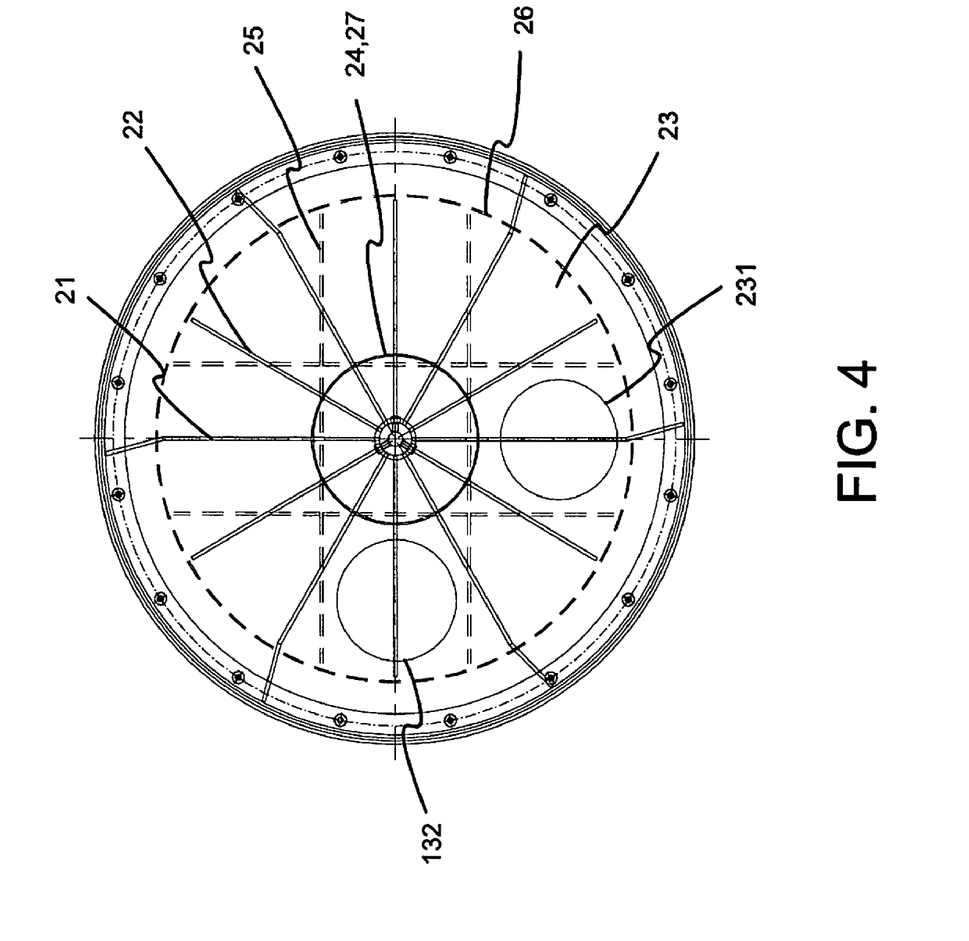
FIG. 4 is a cross-sectional view of the continuous constant-rate feeding system taken along a line A-A shown in FIG. 1.

Referring to FIGS. 1 and 3, the storage unit includes a tank 10, an inlet pipe 11, an outlet pipe 13, an upper ball valve 12, a lower ball valve 14, an agitator-driving motor 15, a window 16, a security valve 17, an exhaust valve 18 and a pressure regulator 19. The tank 10 includes upper and lower shells connected to each other via a flange 103 so that they can be detached from each other for maintenance of elements located in the tank 10. The tank 10 is used to store material.

The inlet pipe 11 is connected to the upper shell of the tank 10. The inlet pipe 11 is shaped like a horn, i.e., it gets larger as it extends downward, thus avoiding frictional bridging of the material.

The upper ball valve 12 is connected to the inlet pipe 11 to control the feed of the material and ensure air-tightness. There is only one upper ball valve 12 shown in FIG. 1; however, there may be two upper ball valves 12 connected to each other in series to ensure the air-tightness of the tank 10 when the lower ball valve 14 is opened.

The outlet pipe 13 is connected to the lower shell of the tank 10. The outlet pipe 13 is shaped like a horn, i.e., it gets larger as it extends downward, thus avoiding frictional bridging of the material. The outlet pipe 13 includes a lower open end 132 in communication with an upper open end of the lower ball valve 14.

A tube 131 is connected to the outlet pipe 13 at 45°. Pressurized air can be transmitted into the outlet pipe 13 through the tube 131. The pressurized air is used to blow any of the material that sticks to the output pipe 13, thus avoiding bridging of the material in the outlet pipe 13. Hence, substantially all of the material leaves the outlet pipe 13.

The lower ball valve 14 is connected to the outlet pipe 13 to control the feed of the material and ensure air-tightness.

An agitator 104 is substantially located in the tank 10 except an upper end connected to the agitator-driving motor 15 located on the tank 10 and, more particularly, on the upper shell of the tank 10. Driven by the agitator-driving motor 15, the agitator 104 agitates the material, thus avoiding frictional bridging of the material fed by the continuous constant-rate feeding system 100.

The window 16 is located on the tank 10 and, more particularly, on the upper shell of the tank 10. The feed of the material in the tank 10 and the operation of the elements in the tank 10 can be observed via the window 16. The window 16 is equipped with a window-blowing pipe 161. Pressurized air can be blown onto an internal side of the window 16 via the window-blowing pipe 161. Thus, any of the material that sticks to the internal side of the window 16 can be removed by the flow of the pressurized air. That is, the window 16 can be cleaned to ensure clear sight of people who operate the continuous constant-rate feeding system 100.

The security valve 17 is located on the tank 10 and, more particularly, on the upper shell of the tank 10. The security valve 17 can automatically be opened to release air from the tank 10 when the pressure in the tank 10 reaches a predetermined upper limit.

The exhaust valve 18 is located on the tank 10 and, more particularly, on the upper shell of the tank 10. The exhaust valve 18 can be opened to release air from the tank 10 when the material is fed into the tank 10 through the upper ball valve 12 and the inlet pipe 11.

The pressure regulator 19 is connected to the tank 10 and, more particularly, to the lower shell of the tank 10. The pressure regulator 19 can allow air into the tank 10 to increase the pressure in the tank 10 and retain the balance of pressure inside and outside the tank 10.

Referring to FIGS. 1 and 4 to 7, the scratching unit 20 includes an upper scratcher 21, a lower scratcher 22, a material divider 23, a cap 24, a reinforcement element 25, an external material-limiting element 26, an internal material-limiting element 27, a scratcher speed reduction assembly 28 and a variable-frequency drive 29. The scratching unit 20 is substantially located in the tank 10.

Figure 5:
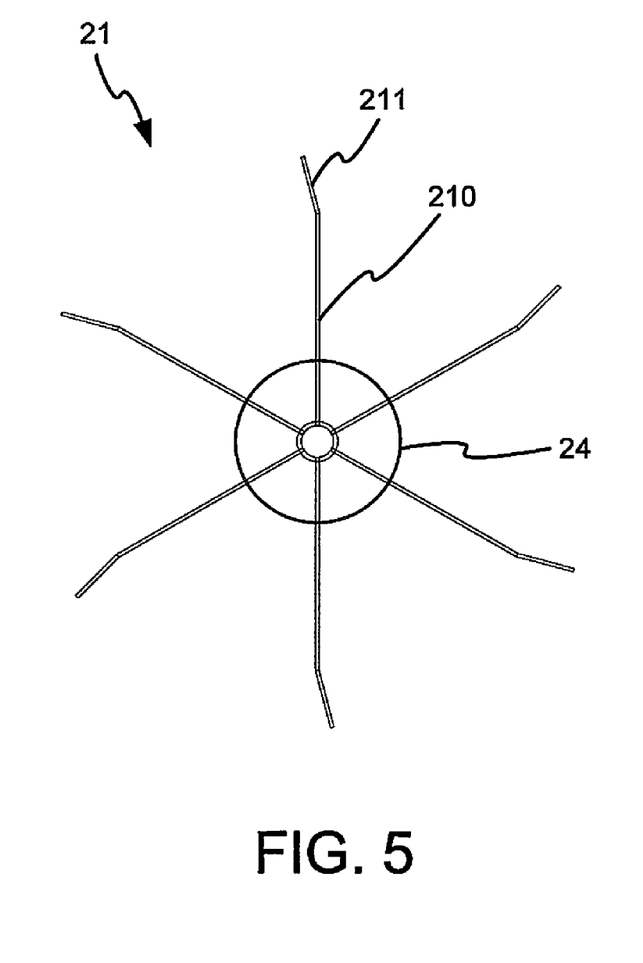
FIG. 5 is a cross-sectional view of the continuous constant-rate feeding system taken along a line B-B shown in FIG. 1.

Referring particularly to FIGS. 1 and 5, the upper scratcher 21 includes several blades 210, e.g., 6 blades 210. Each of the blades 210 includes a first end connected to a common hub and a second end that is bent in a counterclockwise manner. The second end of each of the blades 210 is used as a guiding section 211. As the upper scratcher 21 spins counterclockwise, the guiding sections 211 of the blades 210 cause the material to move toward the axis of the tank 10, i.e., away from an internal face of the tank 10. Thus, the dead volume in the tank 10 is reduced.

The cap 24 is connected to the blades 21. The cap 24 reinforces the upper scratcher 21 and protectively covers a vertical axle inserted through and connected to the hub of the upper scratcher 21.

Figure 6:
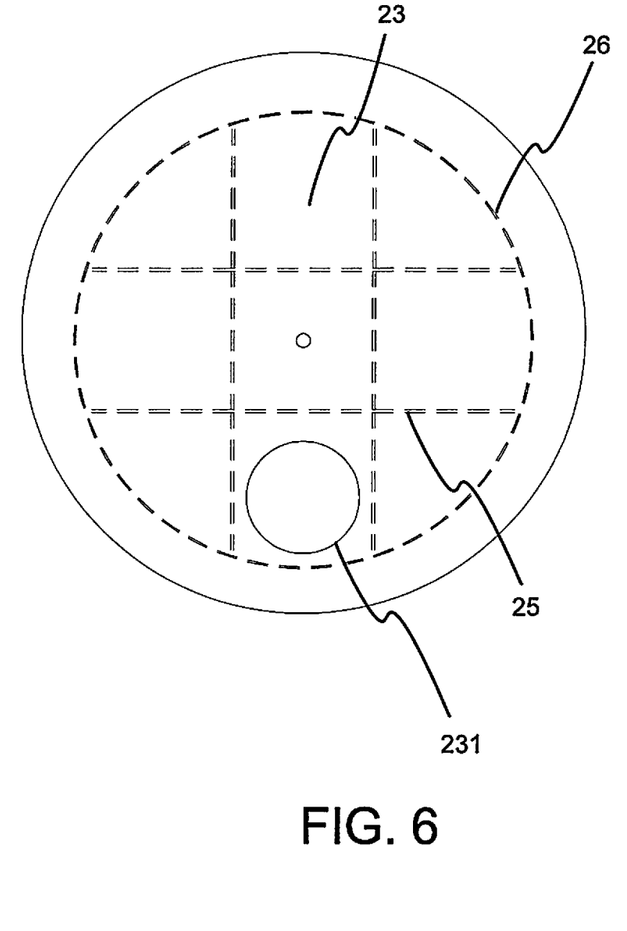
FIG. 6 is a cross-sectional view of the continuous constant-rate feeding system taken along a line C-C shown in FIG. 1.

Referring particularly to FIGS. 1 and 6, the material divider 23 is a circular plate located between the scratchers 21 and 22 in the tank 10. The material divider 23 divides the material the tank 10 into an upper chamber 101 and a lower chamber 102. That is, the tank 10 becomes a double-deck structure. The upper scratcher 21 is located in the upper chamber of the tank 10 while the lower scratcher 22 is located in the lower chamber of the tank 10. The material divider 23 is connected to the vertical axle.

The material divider 23 includes an aperture 231 defined therein. The material is conveyed from the upper chamber 101 into the lower chamber 102 through the aperture 231 batch by batch as the material divider 23 spins.

The reinforcement element 25 includes several ribs attached to a lower face of the material divider 23. Thus, the reinforcement element 25 reinforces the material divider 23.

The external material-limiting element 26 is an annular rib attached to the lower face of the material divider 23, around the reinforcement element 25. The external material-limiting element 26 reinforces the material divider 23.

Figure 7:
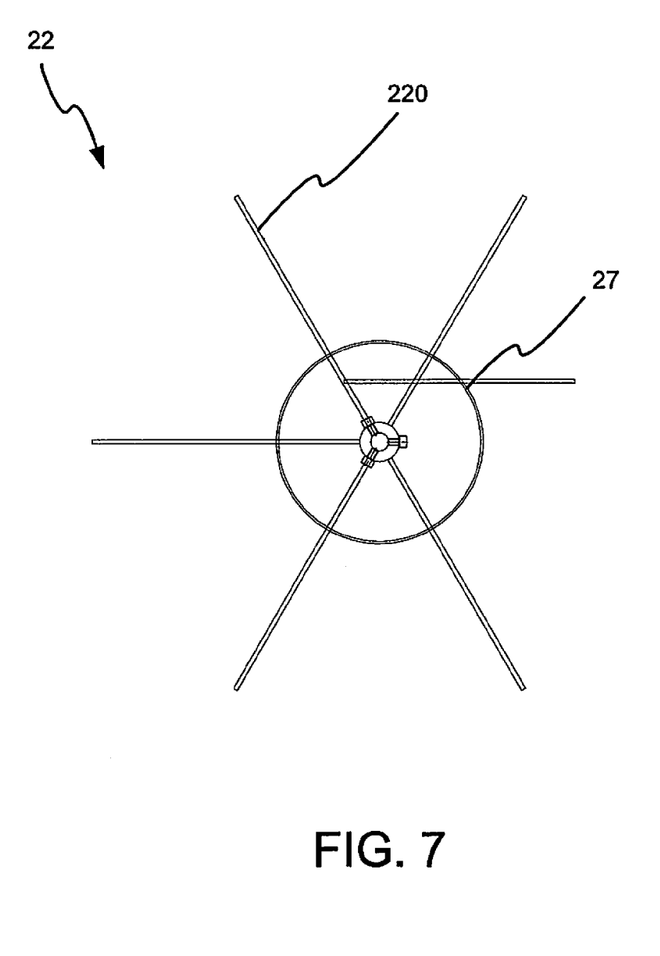
FIG. 7 is a cross-sectional view of the continuous constant-rate feeding system taken along a line D-D shown in FIG. 1.

Referring particularly to FIGS. 1 and 7, the lower scratcher 22 includes several blades 220, e.g., 6 blades 220. Each of the blades 220 includes a first end connected to a common hub and a second end. The vertical axle is inserted through and connected to the hub of the lower scratcher 22.

The internal material-limiting element 27 is an annular rib attached to the upper face of the lower scratcher 22. Thus, the internal material-limiting element 27 reinforces the lower scratching element 22. Moreover, the internal material-limiting element 27 cooperates with the external material-limiting element 26 to limit the material between them.

The scratcher speed reduction assembly 28 is connected to the vertical axle. That is, the scratcher speed reduction assembly 28 is connected to the scratchers 21 and 22 and the material divider 23. The scratcher speed reduction assembly 28 is operable to reduce the speed of the scratchers 21 and 22 and the material divider 23 but increase the torque of the scratchers 21 and 22 and the material divider 23.

The variable frequency drive 29 is connected to the scratcher speed reduction assembly 28. The operation of the scratcher speed reduction assembly 28 is under the control of the variable frequency drive 29.

Figure 8:
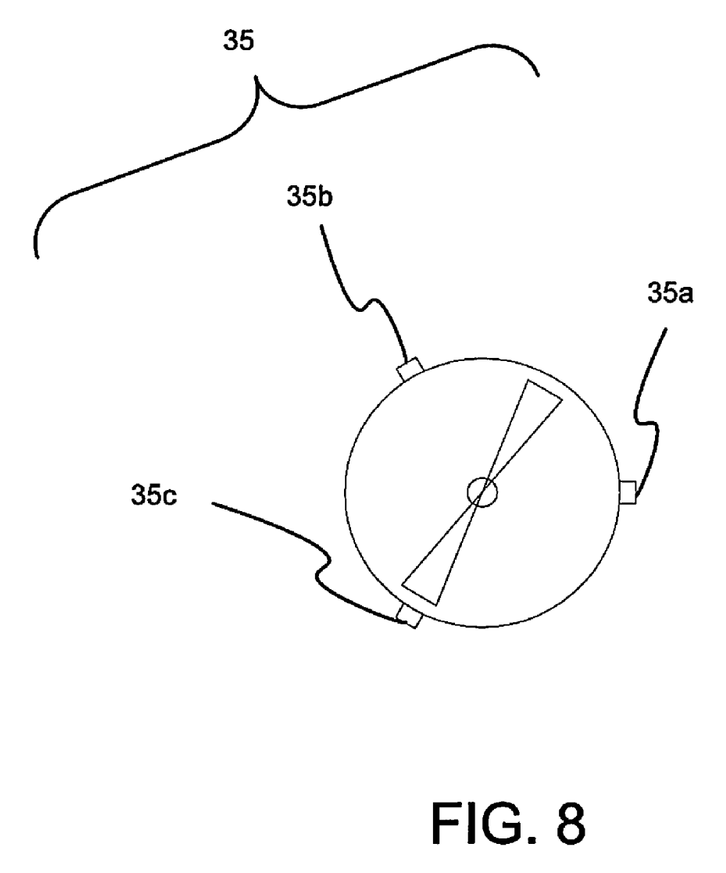
FIG. 8 is a cross-sectional view of the continuous constant-rate feeding system taken along a line E-E shown in FIG. 1.

Referring to FIGS. 1 and 8, the water-cooled screw feeding unit includes a screw feeder 30, a double seal 31, a cooling water-recycling joint 32, a gear motor 33, a pipe 34 and a group 35 of sensors 35a, 35b and 35c. The screw feeder 30 includes a screw rotationally inserted through a hollow cylinder. The screw includes a helical blade extending around a hollow axle.

The double seal 31 is attached to an end of the hollow cylinder of the screw feeder 30. An end of the hollow axle of the screw of the screw feeder 30 is inserted through the double seal 31.

The cooling water-recycling joint 32 is connected to the hollow axle of the screw of the screw feeder 30 through the double seal 31. Thus, cooling water can be transmitted through the hollow axle of the screw of the screw feeder 30 for cooling.

The gear motor 33 is connected to the end of the hollow axle of the screw of the screw feeder 30. In detail, a pulley is connected to the mandrel of the gear motor 33, another pulley is connected to the hollow axle of the screw of the screw feeder 30, and a belt is wound on the pulleys. Thus, the gear motor 33 can be used to spin the screw of the screw feeder 30.

The sensors 35a, 35b and 35c are connected to the hollow cylinder of the screw feeder 30. The sensors 35a, 35b and 35c are used to determine whether the material is jammed in the hollow cylinder of the screw feeder 30 based on the direction of the spinning of the screw of the screw feeder 30 and the length of the time required for the screw of the screw feeder 30 to spin a certain angle.

There is only one storage unit as shown. However, there would preferably be two storage units to ensure the continuous operation of the continuous constant-rate feeding system 100. Material is filled into one of the storage units while other material is conveyed from the other storage unit. Thus, the storage units are operated alternately to ensure the continuous operation of the continuous constant-rate feeding system 100.

Figure 2:
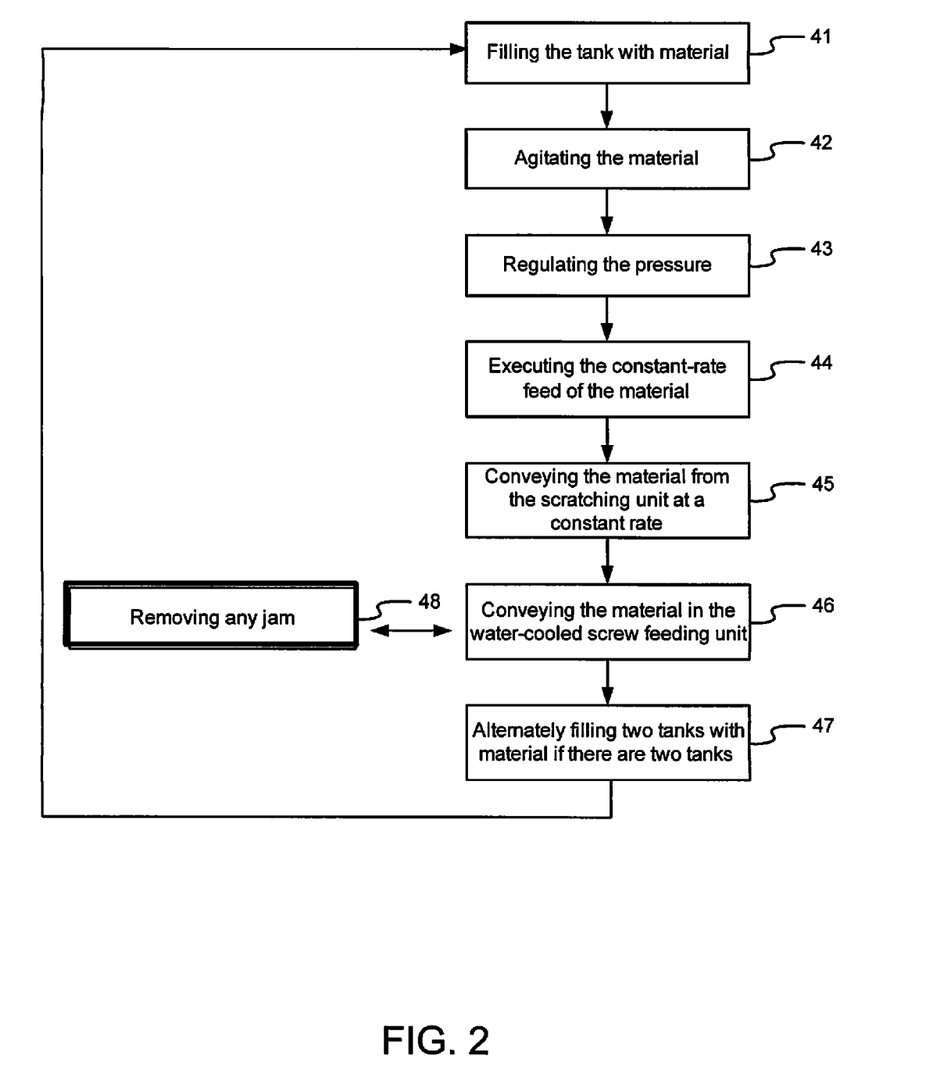
FIG. 2 is a flow chart of a method for operating the continuous constant-rate feeding system shown in FIG. 1.

Referring to FIG. 2, the operation of the continuous constant-rate feeding system 100 will be described. At 41, the tank 10 is filled with material. The upper ball valve 12 is opened so that the material falls into the tank 10 through the inlet pipe 11. The material in the tank 10 can be observed through the window 16. If any of the material sticks to the internal side of the window 16, pressurized air is blown onto the internal side of the window 16 through the window-blowing pipe 161. Thus, the material that sticks to the internal side of the window 16 is removed by the flow of the pressurized air.

At 42, the material is agitated. The agitator-driving motor 15 drives the agitator 104 to agitate the material in the tank 10 and avoid frictional bridging of the material. Thus, the material can stably be fed into the scratching unit 20.

At 43, the pressure is regulated. To convey the material into the tank 10, there should be balance between the pressure in the upper chamber 101 and the pressure in the lower chamber 102 to render smooth the conveying of the material from the tank 10. To this end, the pressure regulator 19 allows air into the tank 10 to increase the pressure in the tank 10 before the lower ball valve 14 is opened. Thus, the material falls into the pipe 34 smoothly.

On the contrary, to feed the material into the tank 10, there should be balance between the pressure in the tank 10 and the pressure in the atmosphere. To this end, the exhaust valve 18 is opened to release air from the tank 10.

At 44, the constant-rate feed of the material is executed. The variable frequency drive 29 instructs the scratcher speed reduction assembly 28 to control the speed of the upper scratcher 21. Every time the upper scratcher 21 spins for a round, i.e., 360°, a batch of the material falls from the upper chamber 101 into the lower chamber 102 through the aperture 231 defined in the material divider 23. Then, the scratcher speed reduction assembly 28 drives the lower scratcher 22 so that the material falls from the lower chamber 102 into the outlet pipe 13. The rate of the feed of the material is determined by the volume of each batch of the material and the speed of the spinning of the material divider 23. The volume of each batch of the material is determined by the diameter of the aperture 231. Like the speed of the spinning of the scratchers 21 and 22, the speed of the spinning of the material divider 23 is determined by the variable frequency drive 29 via the scratcher speed reduction assembly 28.

At 45, the material is conveyed from the scratching unit 20 at a constant rate. The variable frequency 29 controls the speed of the spinning of the scratcher speed reduction assembly 28 so that the material falls into the water-cooled screw feeding unit through the lower open end 132 of the outlet pipe 13 and the lower ball valve 14. If there is any bridging of the material in the outlet pipe 13, pressurized air can be blown into the outlet pipe 13 through the tube 131 to remove the material that sticks onto the outlet pipe.

At 46, the material is conveyed in the water-cooled screw feeding unit. The material falls into the hollow cylinder of the screw feeder 30 through the pipe 34. The gear motor 33 drives the screw of the screw feeder 30 in a direction (the "positive direction") through the double seal 31. Thus, the screw feeder 30 conveys the material to a predetermined position.

At 47, two tanks 10 are alternately filled with material where there are two tanks 10. Material is conveyed from one of the tanks 10 while other material is filled into the other tank 10.

At 48, a jam is removed. If there is any jam of any of the material in the screw feeder 30, the sensors 35a, 35b and 35c can detect it and send a corresponding signal to a motor (e.g., the gear motor 33). On receiving the signal, the gear motor 33 drives the screw of the screw feeder 30 in an opposite direction (the "negative direction") by a predetermined angle before the gear motor 33 drives the screw of the screw feeder 30 in the positive direction again. The sensors 35a, 35b and 35c detect periodically. There is a jam when the sensors 35a, 35b and 35c do not detect any spinning of the screw feeder 30 for a predetermined period of time. Whether the predetermined angle of the spinning of the screw feeder 30 has been reached is determined by the sensors 35a, 35b and 35c. The process for removing a jam can be repeated for several times automatically before the jam is removed.

As discussed above, the continuous constant-rate feeding system 100 of the present invention can be operated at a constant rate at high temperature and under high pressure without risks of jam. The rate of the feed with the continuous constant-rate feeding system 100 of the present invention can however be adjusted. The double-deck structure of the tank 10, the upper scratcher 21 and the lower scratcher 22 together can ease jam of the material from the tank 10. The spinning of the screw feeder 30 in the clockwise and counterclockwise directions can conquer jam of the material from the screw feeder 30.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A continuous constant-rate feeding system for use at high temperature and under high pressure without risks of jam, the continuous constant-rate feeding system including:
    at least one storage unit including:
        a tank (10) for storing material, wherein the tank (10) includes upper and lower chambers (101, 102);
        an inlet pipe (11) connected to the upper chamber (101);
        an upper ball valve (12) connected to the inlet pipe (11);
        an outlet pipe (13) connected to the lower chamber (102);
        a lower ball valve (14) connected to the outlet pipe (13); and
        an agitator (104) rotationally located in the upper chamber (101) for agitating and preventing the material from sticking to the tank (10);
    a scratching unit (20) including:
        an upper scratcher (21) located in the upper chamber (101) and formed with blades (210) each formed with a bent guiding section (211), wherein the upper scratcher (21) can spin to convey the material from the upper chamber (101) into the lower chamber (102);
        a cap (24) connected to the blades (210) of the upper scratcher (21);
        a lower scratcher (22) located in the lower chamber (102) and formed with blades (220), wherein the lower scratcher (22) can spin to convey the material from the lower chamber (102) into the outlet pipe (13);
        an internal material-limiting element (27) located on and connected to the blades (220) of the lower scratcher (22);
        a material divider (23) located between the upper and lower chambers (101, 102) and formed with an aperture (231) defined therein, wherein the material falls from the upper chamber (101) into the lower chamber (102) through the aperture (231) batch by batch as the material divider (23) spins; and
        an external material-limiting element (26) located beneath and connected to the material divider (23); and
    a water-cooled screw feeding unit including:
        a screw feeder (30) connected to the lower ball valve (14);
        a double seal (31) connected to the screw feeder (30);
        a cooling water-recycling joint (32) connected to the screw feeder (30) through the double seal (31);
        a gear motor (33) connected to the screw feeder (30); and
        at least three sensors (35a, 35b, 35c) for sensing the operation of the screw feeder (30) and sending a corresponding signal to the gear motor (33).

2. The continuous constant-rate feeding system according to claim 1, including two storage units wherein material is fed into one of the storage units while other material is conveyed from the other storage unit.

3. The continuous constant-rate feeding system according to claim 1, wherein both of the inlet and outlet pipes (11, 13) get larger as they extend downward to prevent any of the material from sticking thereto.

4. The continuous constant-rate feeding system according to claim 1, wherein the upper and lower chambers (101, 102) are interconnected by a flange (103).

5. The continuous constant-rate feeding system according to claim 1, wherein the cap (24) is in the shape of a conical frustum on which the material slides downward.

6. The continuous constant-rate feeding system according to claim 1, wherein the scratching unit (20) includes a reinforcement element (25) attached to the material divider (23).

7. The continuous constant-rate feeding system according to claim 1, wherein the tank (10) includes:
- a window (16) through which the material in the tank (10) can be observed;
- a security valve (17) for releasing air from the tank (10) when the pressure in the tank (10) reaches a predetermined upper limit;
- an exhaust valve (18) for releasing air from the lower chamber (102) to facilitate the feed of the material into the lower chamber (102); and
- a pressure regulator (19) for allowing air into the tank (10).

8. The continuous constant-rate feeding system according to claim 7, wherein the tank (10) includes a window-blowing pipe (161) through which pressurized air can be blown onto the window (16) for cleaning.

9. The continuous constant-rate feeding system according to claim 1, wherein the storage unit includes a tube (131) through which pressurized air can be blown into the outlet pipe (13) for removing any jam of the material from the outlet pipe (13).

10. The continuous constant-rate feeding system according to claim 1, wherein the sensors (35a, 35b, 35c) sense the direction of the spinning of the screw feeder (30) and determine whether the screw feeder (30) spins or stops, wherein the gear motor (33) drives the screw feeder (30) in a positive direction normally, wherein the gear motor (33) drives the screw feeder (30) in a negative direction before it drives the screw feeder (30) in the positive again in any jam of the material in the screw feeder (30).

11. The continuous constant-rate feeding system according to claim 1, wherein the scratching unit (20) includes:
- a scratcher speed reduction assembly (28) operable for reducing the speed of the spinning of the upper and lower scratchers (21, 22); and
- a variable frequency drive (29) operable for controlling the scratcher speed reduction assembly (28).

12. A continuous constant-rate feeding method including the steps of:
providing at least one storage unit including:
- a tank (10) for storing material, wherein the tank (10) includes upper and lower chambers (101, 102); and
- an agitator (104) for agitating and preventing the material from sticking to the tank (10);
- allowing air into the tank to achieve balance between the pressure in the upper chamber and the pressure in the lower chamber when the material is conveyed from the tank;
- releasing air from the tank to achieve balance between the pressure in the tank and the pressure in the atmosphere when the material is fed into the tank;
- providing an upper scratcher (21) for conveying the material from the upper chamber (101) into the lower chamber (102);
- providing a lower scratcher (22) for conveying the material from the lower chamber (102);
- providing a material divider (23) with an aperture (231) defined therein, wherein the material falls from the upper chamber (101) into the lower chamber (102) through the aperture (231) batch by batch as the material divider (23) spins;
- providing a scratcher speed reduction assembly (28) for reducing the speed of the spinning of the upper and lower scratchers (21, 22);
- providing a screw feeder (30) for conveying the material from the lower chamber (102) to a predetermined position;
- providing a gear motor (33) for driving the screw feeder (30);
- providing at least three sensors (35a, 35b, 35c) for sensing the operation of the screw feeder (30) and sending a corresponding signal to the gear motor (33), wherein the gear motor (33) drives the screw feeder (30) in a positive direction normally, wherein the gear motor (33) drives the screw feeder (30) in a negative direction before it drives the screw feeder (30) in the positive again in any jam of the material in the screw feeder (30).

13. The continuous constant-rate feeding method according to claim 12, wherein the step of including at least one storage unit includes the step of providing two storage units, wherein material is fed into one of the storage units while material is conveyed from the other storage unit.

14. The continuous constant-rate feeding method according to claim 12, wherein the step of providing the storage unit includes the step of providing a window (16) through which the material in the tank (10) can be observed.

15. The continuous constant-rate feeding method according to claim 14, wherein the step of providing the window includes the step of providing a window-blowing pipe (161) through which pressurized air can be blown onto the window (16) for cleaning.

16. The continuous constant-rate feeding method according to claim 12, wherein the step of providing the storage unit includes the step of providing an outlet pipe (13) for conveying the material from the lower chamber (102).

17. The continuous constant-rate feeding system according to claim 16, wherein the step of providing the outlet pipe (13) includes the step of providing a tube (131) through which pressurized air can be blown into the outlet pipe (13) for removing any jam of the material from the outlet pipe (13).

* * * * *